US012773727B2

(12) United States Patent
Merkel et al.

(10) Patent No.: US 12,773,727 B2
(45) Date of Patent: Oct. 27, 2026

(54) METHOD AND APPARATUS FOR DE-POWDERING ADDITIVELY MANUFACTURED COMPONENTS

(71) Applicant: Rösler Holding GmbH, Bad Staffelstein (DE)

(72) Inventors: Till Merkel, Neu-Ulm (DE); Florian Müller, Ebern (DE); Domenik Braunroth, Coburg (DE); Moritz Beck, Bad Staffelstein (DE)

(73) Assignee: Rösler Holding GmbH, Bad Staffelstein (DE)

( * ) Notice: Subject to any disclaimer, the term of this patent is extended or adjusted under 35 U.S.C. 154(b) by 58 days.

(21) Appl. No.: 18/937,482

(22) Filed: Nov. 5, 2024

(65) Prior Publication Data

US 2025/0144712 A1 May 8, 2025

(30) Foreign Application Priority Data

Nov. 6, 2023 (DE) ......................... 102023130611.1

(51) Int. Cl.

| | |
|---|---|
| ***B22F 10/68*** | (2021.01) |
| ***B08B 7/02*** | (2006.01) |
| ***B29C 64/30*** | (2017.01) |
| ***B33Y 40/20*** | (2020.01) |

(52) U.S. Cl.
CPC ................ *B22F 10/68* (2021.01); *B08B 7/02* (2013.01); *B29C 64/30* (2017.08); *B33Y 40/20* (2020.01)

(58) Field of Classification Search
None
See application file for complete search history.

(56) References Cited

U.S. PATENT DOCUMENTS 11,794,254 B1 * 10/2023 Hoy ........................ B22F 10/68
2023/0150203 A1 5/2023 Hutchinson

FOREIGN PATENT DOCUMENTS

| | | | |
|---|---|---|---|
| DE | 102017220640 | A1 | 5/2019 |
| WO | 2018199894 | A1 | 11/2018 |
| WO | 2024010691 | A1 | 1/2024 |
| WO | 2024254256 | A2 | 12/2024 |

OTHER PUBLICATIONS

German Search Report dated Oct. 6, 2024 corresponding to DE102023130611.1, 12 pages.

* cited by examiner

*Primary Examiner* — Eric W Golightly
(74) *Attorney, Agent, or Firm* — Dickinson Wright PLLC

(57) ABSTRACT

To de-powder additively manufactured components located in a powder cake, the powder cake is first transferred into an enclosure and is then set into vertical vibration within the enclosure in a de-powdering station.

10 Claims, 2 Drawing Sheets

METHOD AND APPARATUS FOR DE-POWDERING ADDITIVELY MANUFACTURED COMPONENTS

CROSS-REFERENCE TO RELATED APPLICATIONS

This application claims the benefit of German Patent Application No. 102023130611.1, filed on Nov. 6, 2023. The entire disclosure of the application referenced above is incorporated herein by reference.

BACKGROUND OFTHE INVENTION

The present invention relates to methods and apparatus for de-powdering additively manufactured components located in a powder cake.

As a result of powder bed-based methods for manufacturing components via additive manufacturing (e.g. SLS, M JF, SAF, binder jetting), so-called build jobs are produced. A build job consists of the components that are solidified in the process from powder particles, partly solidified powder and non-solidified powder. These components are produced and are located in a build job container once the manufacturing process has been completed. Depending on the manufacturer's parameters (powder type, quality of the powder, particle size distribution, temperature control, melting ranges of the material, etc.), the non-solidified and thus reusable powder is also present in smaller and also larger agglomerates. This process-related agglomeration can go so far that a separation of the build job into its components can only take place through strong mechanical action.

For this reason, there are various methods in the prior art in which the separation process (separation of the components from the partly solidified and non-solidified powder components) is preceded by a process step that serves to break up the completely or partly compacted build job. In a known method, the build job is discharged freely from the build job container at a high drop height into a de-powdering volume. When impacting the bottom of the de-powdering volume, the build job (powder cake) then breaks apart in a disordered and non-reproducible manner. In another known method, a drop stage is integrated into a de-powdering space and is likewise intended to lead to the disordered and thus non-reproducible breaking up of the powder cake. In the methods described in the prior art, the actual separation then follows, in which the components are separated from partly solidified and non-solidified powder by a combination of compressed air, dust extraction, and vibration.

EP 3 565 706 A discloses an unpacking unit in which the build job (components in the powder cake) is to be separated into the components powder and components by vibration of the build job container. This unpacking unit can be coupled to a powder separation unit. However, for larger build jobs or for build jobs with a high solidification of the powder cake, a separation of the components from the residual powder in such a structure is not guaranteed. The breaking up of the build job takes place in an unregulated and non-reproducible manner, the agglomerates cannot be reliably separated, and the build job containers are too solid for large build jobs and too light and sensitive for small build jobs to separate a wide range of components (simple to complex) completely and without damage via vibration alone and to simultaneously prevent the build job container from being mechanically overloaded or damaged in the process.

BRIEF SUMMARY OF THE INVENTION

It is the object of the present invention to provide a method and an apparatus that enable a simple, reliable, reproducible and also economical separation of the components from the powder cake.

This object is satisfied by the features of the independent claims.

In a method according to the invention for de-powdering additively manufactured components located in a powder cake, the powder cake is first transferred into an enclosure and is then set into vibration solely in a vertical direction within the enclosure in a de-powdering station by a vibration generator.

Due to the transfer of the entire powder cake from a build job container, the advantage first results that the method can be carried out irrespective of the size and nature of the build job container since the latter is not vibrated itself. Furthermore, in the method according to the invention, a vibration generator is used that is configured and arranged such that it sets the powder cake into vibration solely in the vertical direction (vertical oscillator). Here, a vertical oscillator is understood according to the invention as one whose amplitude extends predominantly in the vertical direction, i.e. transverse vibrations in the horizontal direction are at most present in a negligible proportion.

According to the invention, it has now been found that an introduction of solely vertical vibrations into the powder cake when adapting the frequency and amplitude of the vibrations can be successfully used to run through necessary process phases during the de-powdering, for example the breaking up of the build job into fragments, the de-agglomerating of the fragments, the pulverizing of the non-solidified or partly solidified powder material adhering to the build job or also the fluidizing of the powder. To carry out these process phases effectively, parameters that are adapted to the properties of the respective build job can be defined for each of these process phases in a fixed process window.

For example, in the fluidizing process phase, the loose powder can be converted into a flowable state by reducing the bulk density. By selecting the frequency and amplitude of the vertical oscillator appropriately, it is also possible to first separate the loose powder during fluidization and to then reduce it in its bulk density compared to the initial state in the still compact build job by adapting the frequency and amplitude. It is also possible to increase the initial volume of the powder during fluidization, wherein an increase by approximately +/−20% is possible depending on the composition of the powder and the size of the volume of the powder cake.

Advantageous embodiments of the invention are described in the description, in the drawing and in the dependent claims.

According to a first advantageous embodiment, the powder cake can be transferred from a build job container into the enclosure by means of a lifting device. In this respect, the lifting device can, for example, perform a vertical lift (from above or below) or also a horizontal lift (from the side), wherein the powder cake can be transferred from the build job container into the enclosure using a lift plate or a push plate, for example.

The enclosure is a type of housing that surrounds the build job at all sides, wherein the volume between the outer surfaces of the build job and the side walls of the enclosure is minimized as far as possible. The build volume is hereby kept constant during the transport of the powder cake as well as at the start of and also during the de-powdering process, which has proven to be particularly advantageous.

It can furthermore be advantageous if the powder cake is acted on by a cover plate within the enclosure. If this takes place during a transfer of the powder cake to the de-powdering station, the powder cake is held securely in the enclosure during the transport. If the powder cake is acted on by a cover plate in the de-powdering station during the de-powdering, the pressure on the powder cake and also the volume within the enclosure can be suitably varied to carry out the individual process phases in an optimized manner.

According to a further advantageous embodiment, the enclosure with a powder cake located therein can be transferred by a transport device into the de-powdering station. The de-powdering is hereby carried out completely independently of the build job container and the de-powdering process takes place in the de-powdering station solely within the enclosure. Here, the shape, strength and geometry of the build job remains unchanged until the start of the de-powdering process so that the initial parameters of the build job (weight, shape, density and geometry) likewise remain unchanged. Accordingly, the required process parameters for the various process phases can be selected appropriately based on the parameters of the original build job. The powder released from the build job in the de-powdering station can still be located completely within the enclosure even after the de-powdering process.

According to a further advantageous embodiment, the cover plate and/or the side walls of the enclosure can each be adjustable orthogonally to the powder cake so that the volume within the enclosure can be changed and can be adapted to a respective powder cake. It can be advantageous here if the volume within the enclosure during the transport is at most approximately 10% greater than the volume of the powder cake.

According to a further advantageous embodiment, the transfer of the powder cake into the de-powdering station can take place in that the powder cake located in the enclosure is pushed over a transport table by shifting the enclosure in the horizontal. However, it is also possible to provide the enclosure with a base.

According to a further advantageous embodiment, the enclosure can be anchored in the de-powdering station at a vibration plate at which the vibration generator is located. For example, the de-powdering station can have a vibration plate which is supported on springs and at whose lower side the vertical oscillator is mounted that can, for example, comprise two vibromotors rotating in opposite directions. Anchoring the enclosure to the vibration plate can, for example, take place via hydraulically or pneumatically activated clamping levers so that no relative movement takes place between the enclosure and the vibration plate during a vibration of the vibration plate.

Since the vibration plate is preferably supported on springs, it will lower slightly after the powder cake has been transferred onto the vibration plate due to the weight of the powder cake. It can therefore be advantageous if at least one actuator is provided at the de-powdering station, with which actuator the vibration plate can be slightly raised in height to ensure a step-free return of the contents of the enclosure from the de-powdering station.

According to a further advantageous embodiment, it can be advantageous if the de-powdered components are weighed after the de-powdering since a conclusion regarding the degree of de-powdering can hereby be drawn, which is advantageous for quality assurance. It can also be advantageous here if the powder cake is weighed before the de-powdering and/or the powder removed from the components is weighed.

With the method according to the invention, a wide variety of process phases and in particular at least three of the initially mentioned process phases can be run through with a single apparatus, wherein, in all cases, only a vibration of the powder cake is performed for the de-powdering, i.e. the method according to the invention does not comprise any other measures for de-powdering, such as dropping, applying compressed air, rotating the components in a chamber or the like.

To run through the individual process phases, the frequency and amplitude of the vertical oscillator are set appropriately by a control. In this respect, it is also possible to set the frequency and amplitude of the vertical oscillator such that the components float on the powder released from the components so that the components can be easily separated. It can also be advantageous here if the components, in particular the floated-on components, are removed from the enclosure via a removal apparatus. Alternatively, a manual removal is naturally also possible.

According to a further advantageous embodiment, the enclosure can be transferred by a transport device into a powder removal station in which the powder released from the components is removed from the enclosure in the first place. In this embodiment variant, no powder is therefore removed in the de-powdering station. If, for example, the powder removed from the at least one component has already been fluidized in the de-powdering station, this powder can flow downwards in the powder removal station via openings provided there. For this purpose, a perforated plate that can be set into vibration by a vibration unit can, for example, be provided in the powder removal station. The powder removed in this way can also be freed from thermally damaged or agglomerated powder residues using a sieve.

According to a further advantageous embodiment, the removed powder can be fed to a mixing device in which the powder is mixed with new powder. This powder mixture can then be used to carry out an additive manufacturing process again.

According to a further aspect of the present invention, the invention relates to an apparatus that is in particular suitable for carrying out a method of the above-described kind. Such an apparatus in particular comprises a transfer station, a de-powdering station and a transport device between the transfer station and the de-powdering station. The transfer station is here provided with a lifting device that is configured and adapted to transfer a powder cake with additively manufactured components located therein from a build job container into an enclosure. The enclosure can in this respect be mounted at the transport device to transfer a powder cake located in the enclosure to the de-powdering station. Finally, the de-powdering station can be provided with a vertical oscillator that sets a powder cake located in the enclosure into vibration solely in the vertical direction. Due to such an apparatus, the advantages already initially described result.

According to an advantageous embodiment, the enclosure can have no base and/or the transport device can have a transport table between the transfer station and the de-powdering station, on which transport table the powder cake slides during transport. In this case, the enclosure so-to-say serves as a stabilizing envelope of the powder cake that surrounds and stabilizes the powder cake while the latter is pushed from the transfer station over the transport table to the de-powdering station.

According to an advantageous embodiment, the apparatus can have a powder removal station, wherein said powder removal station is in particular arranged between the transfer station and the de-powdering station. Such an arrangement brings about the advantage that, after the powder cake has been transferred, a transfer can only take place up to the powder removal station so that either an inspection of the powder cake or a manual de-powdering can be performed there.

However, if the de-powdering is to take place mechanically, the powder cake can be transferred from the transfer station directly to the de-powdering station.

According to an advantageous embodiment, the powder removal station can have a powder-permeable support, for example a perforated metal sheet or the like, that is provided with a vibration device at its lower side, for example. By vibrating this support, a fluidized powder can—as already described above—flow out of or be removed from the enclosure. Additionally or alternatively, it is also possible to extract or remove the powder by suction.

According to a further advantageous embodiment, the enclosure can have side walls, at least one of which, in particular two or all of which, can be adjusted orthogonally to a powder cake located therein so that the area surrounded by the side walls can be varied and can be adapted to the powder cake to be transported. An adjustment of the side walls can in this respect take place manually or also in an automated manner.

Furthermore, the enclosure can be provided with a cover plate that can be lowered into the enclosure and that can in particular be varied in its outer contour so that the powder cake can be covered or can be subjected to a desired force at its upper side. The powder cake is hereby securely held during a transport to the de-powdering station. In the de-powdering station, the volume within the enclosure can be adapted to the respective process phase by the cover plate.

According to a further advantageous embodiment, the apparatus can have at least one weighing device that detects the weight of material located in the enclosure. Thus, a weighing device can, for example, be provided to detect the weight of the powder cake transferred into the enclosure. Furthermore, a weighing device can be provided in the region of the de-powdering station and/or the powder removal station, for example at a support provided there, in order, after the powder has been removed from the enclosure, to determine the weight of the components remaining there.

If the powder cake is pushed over a transport table by the transport device, it may occur that residual powder remains on the transport table. It can therefore be advantageous if the transport device has a removal device that removes such powder remaining on the transport table. This can take place, for example, by a trailing suction device, such as a suction strip, and/or also by a trailing removal unit, such as a brush or rotary brush, wherein the latter can sweep the residual powder into a collecting chute, for example.

According to a further advantageous embodiment, the apparatus can, in particular in the region of the powder removal station, have a suction device to remove powder dust arising there.

According to a further advantageous embodiment, the apparatus is provided with a processing station that is connected to the powder removal station via a line. Such a processing station can have a mixing device that is configured and adapted to mix powder supplied by the powder removal station with fresh powder in a predetermined mixing ratio. In the processing station, fresh powder can, for example, be mixed in a ratio of 50:50 with powder returned from the powder removal station. Such a mixture can be produced with an accuracy of less than or equal to 1% and can then be used for the additive manufacturing of further products.

It can also be advantageous here if a conditioning device is arranged in the processing station, with which conditioning device powder located in the processing station can be provided with a predetermined surface moisture. This can take place, for example, by introducing a gas-vapor mixture (e.g. moist air). The moisture conditioning/physical conditioning can be monitored by measuring the relative air humidity and the temperature in the gas space (atmosphere of powder and moist air). For this purpose, in the process control, a sorption isotherm (equilibrium data gas-powder) can be stored that can also be different for different powders and can be selected accordingly via the control. Further load cells, volume measurements and/or conveying devices (pipes, valves, pumps, etc.) can also be present in the processing station to enable the production of a powder mixture based on pre-set mixing parameters with a target value.

With the apparatus according to the invention, various process phases can be carried out during the de-powdering that are then, depending on the respective build job to be de-powdered, carried out successively with suitable parameters and with a parameter set optimized for the respective process phase.

The vertical oscillator can, for example, be used as follows:

- performance of a frequency sweep and measurement of the system amplitude/acceleration (e.g. by a sensor at the vibration plate), setting of the resonant frequency and operation at the resonant frequency; or
- constant operating mode; or
- dynamic control of the vertical oscillator depending on the progress of the process; or
- control linked to the system amplitude; or
- control regulated via a characteristic curve or via a self-learning system (AI).

Possible operating parameters can be selected as follows:

- frequency f=50 Hz+variation of the amplitude (A),
- vibromotor (f=variable/A=constant),
- buttkicker (f=variable/A=regulated via the power),
- eccentric element (f=small/A=high).

Possible variants of the de-powdering process are:

- jogging, shaking, floating, wobbling movement, up/down movement.

Boundary conditions for the process phases are e.g.:

- build job data: height, weight, packing density, complexity/fragility (ratio of inner and outer surfaces), material (polyamides, elastomers, metals, filled plastics), bulk density, particle size, particle size distribution, particle shape (round, angular), powder quality (used powder, new powder, mixed, thermal loads).

In certain applications, it can also be advantageous if the powder cake is not only set into vertical vibrations, but also into horizontal vibrations.

According to a further advantageous embodiment, a funnel can be provided in the powder removal station to transfer powder into a collecting container. Such a funnel can also be provided in the de-powdering station, wherein said funnel can be covered by a metal sheet during the de-powdering operation to prevent the mass of the powder cake from changing undesirably. After the de-powdering process has been completed, such a metal sheet can be replaced with a perforated metal sheet to enable a powder removal. It is also possible to provide a sliding metal sheet with a perforated region and a non-perforated region and then to move it accordingly.

During the de-powdering process, it can be advantageous to adjust the cover plate and/or side walls of the enclosure in order to increase or also to decrease the volume enclosed by them. During the transport of the powder cake from the transfer station to the de-powdering station, it can be advantageous if the side walls and/or the cover plate is/are placed against the powder cake.

The frequency of the vertical oscillator can advantageously be in a range between approximately 1 and 60 Hz. The amplitude during the de-powdering process, i.e. the vibration amplitude of the enclosure or of the vibration plate, can be in a range from approximately 0.1 mm to approximately 10 mm during the de-powdering. This is the vibration amplitude in the vertical direction. The vibration amplitude in the horizontal direction, on the other hand, is minimal at best.

It can also be advantageous to increase the volume enveloped by the enclosure and the cover plate during the de-powdering process to enable a loosening of the powder. It can also be advantageous to fill additional powder into the enclosure during the de-powdering process to increase the powder volume located therein. High packing densities can hereby be minimized and the filling level can be adapted to cause the powder to be fluidized using appropriately selected vibration parameters. Equally, it can also be advantageous, for an improvement of the de-powdering process, to remove powder from the enclosure in order, as a result, to reduce the filling level within the enclosure.

In the powder removal station, it can be advantageous if the powder is vibrated in a frequency range between approximately 1 and 20 Hz, wherein the amplitude can lie between approximately 0.1 mm and approximately 50 mm. It can also be advantageous for the removal of the powder to slowly increase the frequency from 0 Hz to a desired value in order to prevent an abrupt amplification.

When terminating the de-powdering process and/or the powder removal process, it can be advantageous if the frequency of the vibration is abruptly lowered to 0 Hz and an amplification is prevented by the braking effect of a vibration motor. At least two, but also more vibromotors can be provided to generate the solely vertical vibrations.

For example, pre-set programs can be predefined for different de-powdering results from “ultra soft” to “hard”. For example: ultra soft: duration: 30 s, frequency: 20 Hz, amplitude: 0.25 mm-hard: duration: 15 min, frequency: 60 Hz, amplitude: 3 mm. The same build job can generally be printed from the same material in different print hardnesses. If a build job is harder, it can be advantageous to also carry out a harder de-powdering. The same also generally applies to the printing height (higher=harder).

It can be advantageous if the processing station has a mixing container that has a lower closable opening. There can be a perforated grid in the opening and/or the opening can be closed by a sealing disk valve. A movable plate can also be used to close the opening.

Furthermore, in the processing station, a sieve can be provided onto which used powder and fresh powder are conveyed. The sieve can be located above the mixing container and a material hopper for used powder and/or new powder can be provided between the sieve and the mixing container.

The mixing device can have two metering units, for example rotary valves. It can also be advantageous if the mixing container has a load cell. If two rotary valves are provided, an exact mixing ratio between used powder and new powder can be set. A conveying and sieving process can start in the processing station as soon as the filling quantity in the intermediate tanks of the processing station is insufficient. The used powder and the new powder can be conveyed to the sieves via conveying pumps, wherein the sieved powder can also be sieved into the respective intermediate tanks.

The conveying of sieved powder into the processing station can then end as soon as a load cell indicates the desired mass or the desired filling level.

A load cell and/or a sensor for the vertical amplitude of the vibration can be arranged in the region of the enclosure and/or at the vibration plate. A filling level sensor can also be provided in the region of the enclosure.

The present invention will be described in the following purely by way of example with reference to advantageous embodiments and to the enclosed drawings. There are shown:

DETAILED DESCRIPTION

Figure 1:
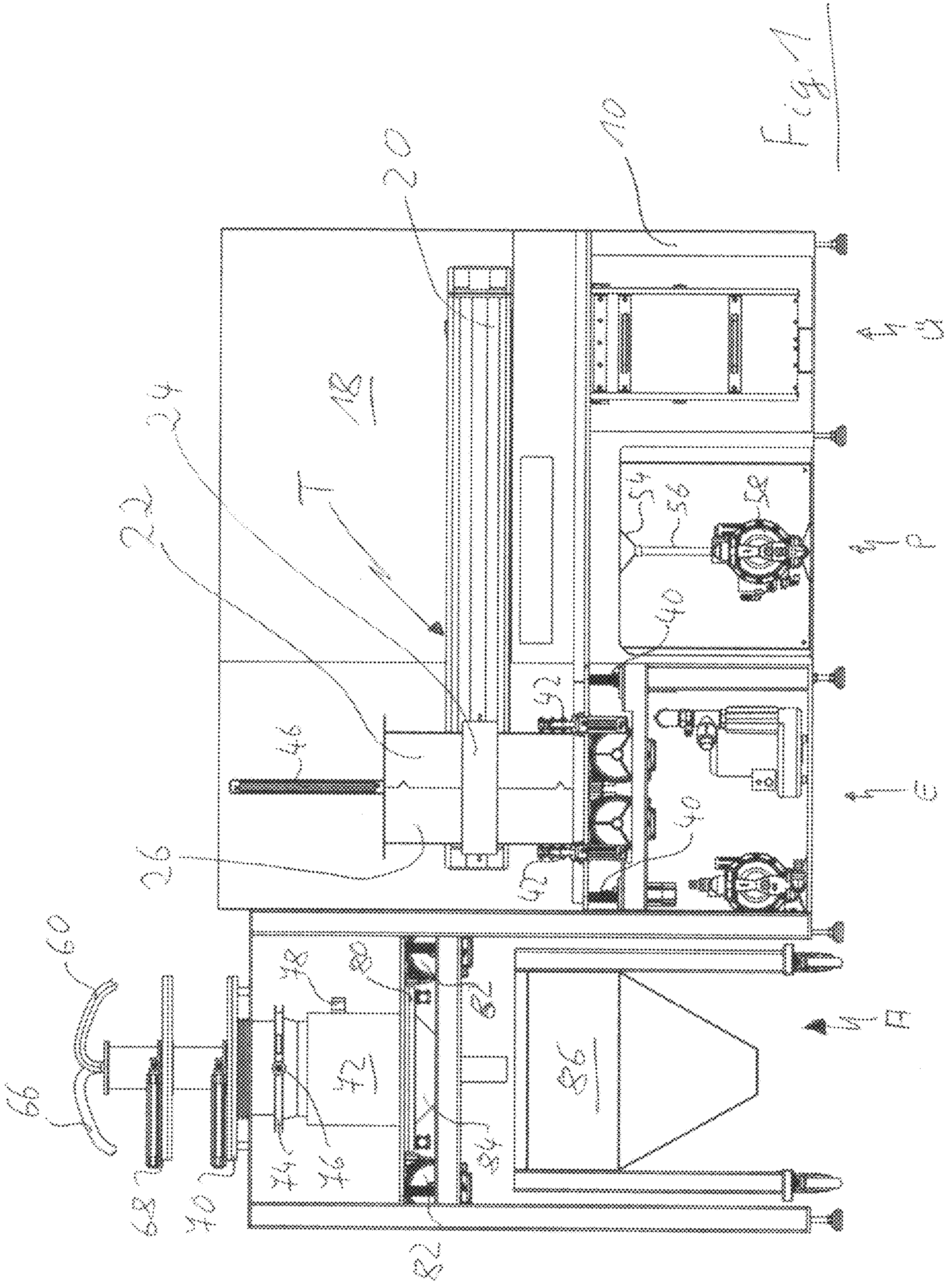
FIG. 1 a front view of a de-powdering system.
Figure 2:
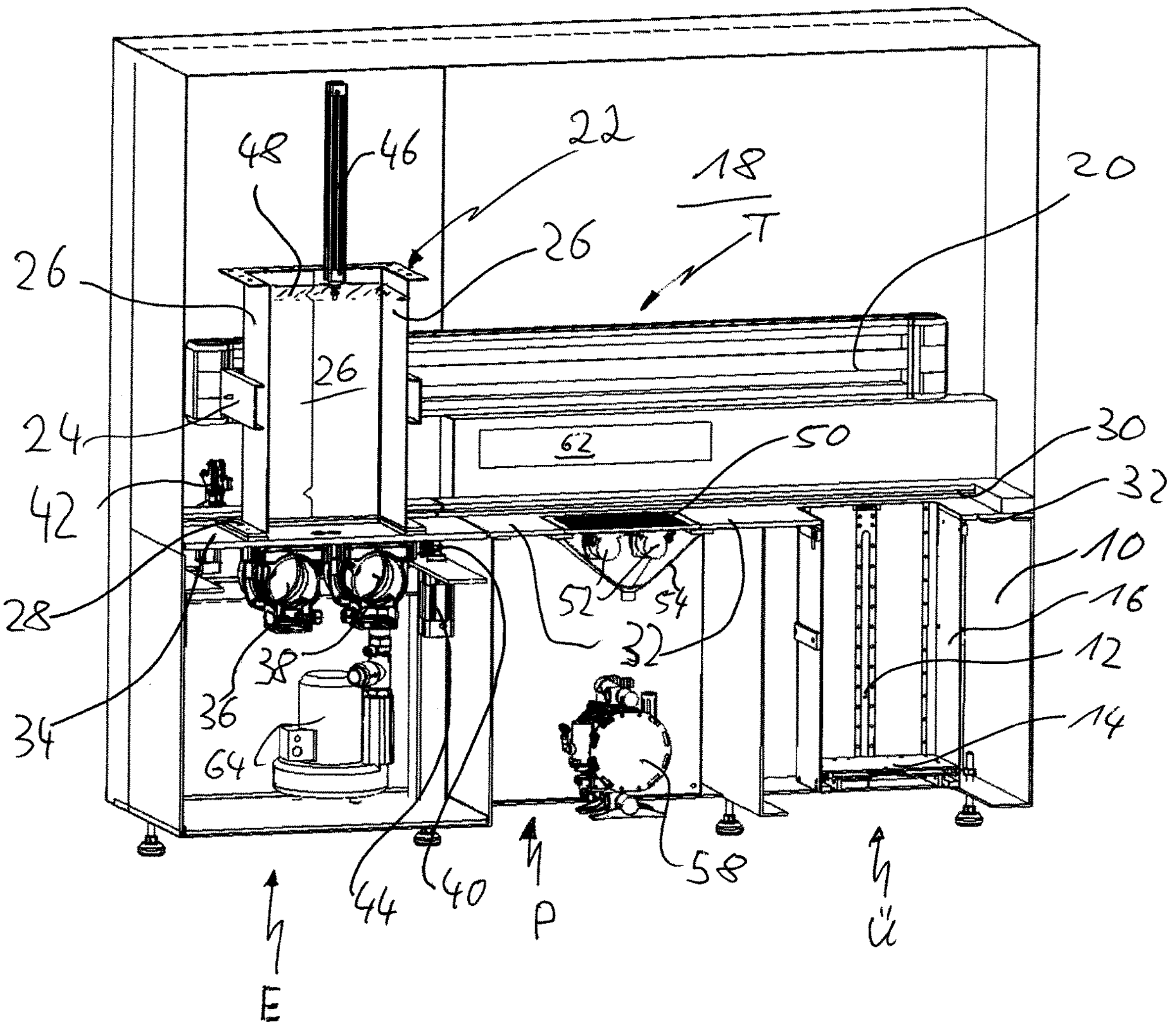
FIG. 2 a perspective partly sectioned view of a part of the de-powdering system of FIG. 1.

The embodiment example of an exemplary de-powdering system shown in FIGS. 1 and 2 comprises a transfer station Ü, a powder removal station P, a de-powdering station E and a processing station A that are arranged next to one another in the order mentioned. Here, the transfer station Ü, the powder removal station P and the de-powdering station E are arranged next to one another on a common base frame 10. The processing station A can be located next to the base frame 10, but does not have to be arranged directly adjoining it.

The transfer station Ü has a free space which is downwardly open towards the installation base and into which a build job container (not shown) can be moved to transfer a powder cake located in the build job container with one or more additively manufactured component(s) located in said powder cake. For this purpose, the transfer station Ü has a lifting device 12 having a base plate 14 with which the powder cake can be transferred. The lifting device 12 is then actuated so that the powder cake can be moved vertically upwardly within a chute 16 of the transfer station Ü. It is understood that the transfer could also take place in a horizontal direction or from top to bottom.

As the Figures furthermore show, the transfer station Ü, the powder removal station P and the de-powdering station E are provided with a common transport device T that extends in a horizontal direction from the transfer station Ü up to the de-powdering station E and comprises a linear drive 20 fastened to a rear wall 18 of the system. With this linear drive 20, an enclosure 22, which is, for example, fastened to the linear drive 20 via a holding frame 24, can be shifted between the individual stations. Alternatively, instead of the holding frame, it is also possible to provide a respective bracket at both sides of the enclosure 22, which bracket is slightly spaced apart from the enclosure and can displace the enclosure 22 using the linear drive 20.

The holding frame 24 is resiliently fastened to the enclosure 22 or surrounds it with some play so that vibrations of the enclosure 22 are not transmitted to the holding frame 24. Furthermore, the enclosure 22 comprises side walls 26 that can be configured as adjustable to vary the area enclosed by the side walls 26. At the lower side of the enclosure 22, said enclosure is provided with a flange 28 that engages into two running rails 30 spaced apart in parallel. The enclosure 22 can hereby slide on a transport table 32 that extends between the transfer station Ü and the powder removal station P. In the region of the powder removal station P, the transport table 32 is adjoined in a flush manner by a vibration plate 34 to whose lower side, for example, two vibromotors 36 and 38 rotating in opposite directions are fastened, with the aid of which the vibration plate 34 can be set into solely vertical vibrations. For this purpose, the vibration plate 34 is supported on the base frame 10 via a plurality of springs 40 so that the vibration plate 34 can vibrate freely in a vertical direction together with the enclosure 22 and the powder cake located therein. In order in this respect to ensure a fixed connection between the enclosure 22 and the vibration plate 34, a plurality of, for example, pneumatically actuable clamping levers 42, with which the enclosure 22 can be fixedly anchored at the vibration plate 34, are provided in the region of the vibration plate 34. For a vertical displacement of the vibration plate 34 relative to the transport table 32, actuators 44 are provided with which the vibration plate 34 can be raised to the level of the transport table 32 if said vibration plate has moved downwards due to the weight of the powder cake.

At the upper side of the enclosure 22, a linear drive 46 is furthermore provided with which a cover plate 48, which is preferably adjustable in its outer contour, can be pushed into the enclosure 22.

To transfer a powder cake with components located therein from a build job container (not shown) into the de-powdering station E, the (empty) enclosure 22 is first moved into the outermost right position using the linear drive 20 so that the enclosure 22 is located above the chute 16 of the transfer station Ü. The lifting device 12 is then actuated so that the base plate 14 with the powder cake located thereon is raised and pushes the powder cake into the enclosure 22 from below. It is particularly advantageous here if the outer contour of the enclosure 22 is only slightly larger than the outer contour of the powder cake. After the base plate 14 has reached the level of the transport table 32, the powder cake can be pushed inside the enclosure 22 over the transport table 32 onto the vibration plate 34. The actuators 44 can here ensure that the vibration plate 34 is not lowered during this process. Prior to transport, it may be advantageous for the side walls 26 and/or the cover plate 48 to be placed against the powder cake within the enclosure 22 in order to maintain the outer shape of the powder cake until has reached the de-powdering station E.

In the de-powdering station E, the clamping levers 42 are then activated or tensioned so that the enclosure 22 is fixedly connected to the vibration plate 34. After lowering the actuators 44, the vibration generator (vertical oscillator), which comprises the two vibromotors 36 and 38 in the embodiment example shown, can then be activated. Said vibromotors are controlled by a control, not shown, that is in turn connected to a process control to run through the initially mentioned process phases in the desired manner. During activation of the vibration generators 36, 38, the vibration plate 34 is set into vibration solely in the vertical direction with a vertical amplitude, wherein said vibration generators are not transferred to the base frame 10 or the transport device T. In this respect, the released powder remains in the enclosure 22.

After the de-powdering process has been performed, the enclosure 22 can then be moved back to the powder removal station P using the linear drive 20. In the powder removal station P, the transport table 32 has a recess which corresponds to the base surface of the enclosure 22 and in which a plate 50 provided with openings is arranged in a flush manner; at the lower side of said plate, a further vibration device 52 is fastened by which the resiliently supported plate 50 can be set into vibration to allow fluidized powder to flow out of the enclosure 22 into a funnel 54 below the recess. The base of the funnel 54 is connected via a line 56 to a powder pump 58 that feeds the extracted powder via a line 60 (FIG. 1) to the processing station A.

In the region of the powder removal station P, a dust extraction device 62 is provided at the rear wall 18 of the frame 10. The reference numeral 64 denotes a fresh powder pump which is arranged in the region of the de-powdering station E and with which fresh powder can be fed via a line 66 to the processing station A.

In the processing station A, the powder that arrived from the powder removal station P via the line 60 and fresh powder fed via the line 66 can be metered and mixed. For this purpose, two mutually spaced apart sliders 68 and 70 are provided below the lines 60 and 66, with which sliders the respective fed powder can be metered into a mixing container 72, wherein an optional sieve 74 is connected upstream of said mixing container. An ultrasonic transducer 76 can further be provided in the region of the sieve to promote a mixing through of the powder. The reference numeral 78 in the region of the mixing container 72 denotes a conditioning device with which, for example, moist air can be fed into the mixing container 72 to provide the powder located therein with a predetermined surface moisture.

The mixing container 72 is in turn arranged on a vibration plate 80 which is resiliently supported and at whose lower side vibration motors 82 are located to achieve a mixing through of the powder located in the mixing container 72. Below the mixing container 72, the mixed powder can then be discharged via a funnel 84 into a provided transport container 86.

Load cells or other weighing sensors can be provided at all the vibration plates of the system described to record the weight of the powder cake or of the components freed from the powder. A weighing sensor can also be arranged at the base plate 14 of the transfer unit Ü.

The invention claimed is:

1. A method for de-powdering additively manufactured components located in a powder cake, wherein the powder cake is first transferred with a lifting device from a build job container into an enclosure, subsequently the enclosure with the powder cake located therein is transferred by a transportor into a de-powdering station, for de-powdering the powder cake, is then set into vibration solely in a vertical direction within the enclosure in the de-powdering station by a vibration generator, wherein powder released from the build job in the de-powdering station is still located completely within the enclosure during and after the de-powdering, and thereafter the enclosure is transferred by the transportor into a powder removal station and only there the powder released from the components is removed from the enclosure.

2. The method according to claim 1, wherein the enclosure is anchored in the de-powdering station at a vibration plate at which the vibration generator is located.

3. The method according to claim 1, wherein the powder cake is acted on by a cover plate within the enclosure.

4. The method according to claim 3, wherein the powder cake is acted on by the cover plate during the de-powdering.

5. The method according to claim 1, wherein the de-powdered components are weighed after the de-powdering.

6. The method according to claim 1, wherein the powder cake is weighed before the de-powdering.

7. The method according to claim 1, wherein the powder removed from the components is weighed.

8. The method according to claim 1, wherein at least one of the following process phases are carried out in the de-powdering station: breaking up the powder cake into fragments, de-agglomerating the fragments, pulverizing powder material adhering to the components, fluidizing the powder, and separating the components from the powder material.

9. The method according to claim 8, wherein, in order to separate the components, the frequency and amplitude of the vibration generator are set such that the components float on the powder released from the components.

10. The method according to claim 1, wherein the removed powder is fed to a mixer in which said removed powder is mixed with new powder.

* * * * *